United States Patent [19]

Ruottu

[11] Patent Number: 4,867,948
[45] Date of Patent: Sep. 19, 1989

[54] FLUIDIZED BED REACTOR
[75] Inventor: Seppo Ruottu, Karhula, Finland
[73] Assignee: A. Ahlstrom Osakeyhtio, Karhula, Finland
[21] Appl. No.: 644,343
[22] Filed: Aug. 27, 1984

Related U.S. Application Data

[63] Continuation-in-part of Ser. No. 397,363, , abandoned.

[30] Foreign Application Priority Data

Aug. 24, 1981 [FI] Finland ............................ 812596

[51] Int. Cl.$^4$ ..................... F27B 15/09; F27B 15/12
[52] U.S. Cl. ..................... 422/145; 55/391; 55/396; 422/147
[58] Field of Search ............ 422/145, 147; 431/7, 431/170; 432/15, 58; 201/31; 55/391, 396

[56] References Cited

U.S. PATENT DOCUMENTS 2,470,395  5/1949  Gohr et al. ............... 422/147 X
3,056,662 10/1962  Ridgway .................... 55/396 X
3,100,693  8/1963  Klein et al. ............... 422/147
3,925,045 12/1975  Cheng ........................ 55/391 X
4,076,796  2/1978  Reh et al. ................. 422/145 X
4,279,627  7/1981  Paul et al. ................ 55/396 X
4,311,670  1/1982  Nieminen .................. 422/147 X Primary Examiner—Barry S. Richman
Assistant Examiner—Amalia Santiago
Attorney, Agent, or Firm—Bucknam and Archer

[57] ABSTRACT

A fluidized bed reactor in which the gases flowing tangentially through a pipe from the upper part of the reactor chamber to a cyclone separator are discharged through a discharge pipe of the separator. The bottom of the cylindrical vortex chamber of the separator is substantially planar and inclined towards the fluidized bed reactor in one embodiment, and conical in another embodiment. The separated solids flow through the return pipe to the lower part of the reactor chamber. The discharge end of the return pipe is disposed inside the lower fluidized bed zone being formed on the bottom of the reactor chamber.

4 Claims, 2 Drawing Sheets

FLUIDIZED BED REACTOR

This is a continuation-in-part of application Ser. No. 397,363, filed July 21, 1982, and now abandoned.

BACKGROUND OF THE INVENTION

The present invention relates to a fluidized bed reactor. The fluidized bed reactor is in the upper part of a reactor chamber of which there is an outlet connected to a vortex chamber of a cyclone separator by means of a pipe tangentially connected thereto for separating solids conveyed by the gases being discharged from the fluidized bed reactor, and which comprises a return pipe for the separated solids, this pipe being connected to the lower part of the separator, and a gas discharge pipe disposed in the separator.

Fast fluidized bed technique utilizing solids circulation has been applied for a long time e.g. in roasting processes and nowadays more widely in various kinds of reactors, such as combustion chambers and gasifiers. In known applications, the separation of solids from the gases occurs in a conventional cyclone separator having a hopper-shaped lower part. The separator has a cylindrical vortex chamber in which there is disposed a gas discharge pipe conveying gases upwards and from which the solids are returned to the reactor through a gas lock. The duty of the gas lock is to prevent the reactor gases from flowing to the cyclone through the discharge pipe. Usually a mechanical locking device or in more developed equipment sand hovering in a U-tube acts as a gas lock of this kind. Especially in high-temperature-reactors the system for returning the solids is complicated expensive. The fact that part of the air required for fluidization in and the gas lock flows upwardly in the discharge pipe has a disadvantageous effect especially on the separation of light and fine-grained material. Moreover, a rising gas flow decreases the transport capacity of the discharge pipe.

It is known that a very low pressure and a high axial flow velocity are formed in the center of a conventional cyclone. Due to this, a conventional cyclone tends to suck from the stand pipe. The suction flow formed does not usually have a tangential velocity, so almost all the solids entrained by it are discharged through the central pipe of the cyclone. A return system provided with a conventional cyclone is thus very sensitive to the suction flows of the return pipe and requires an absolutely reliable gas lock. In steam boiler applications the use of a conventional cyclone leads to a disadvantageous structure, as the conventional cyclone divides the boiler into a separate combustion chamber and a convection part positioned after the cyclone, between which there is disposed equipment for returning the solid material.

Mechanical gas locks wear quickly, especially under hot conditions and they often suffer from operational disturbances.

It is also known to position a conventional cyclone inside a reactor, whereby the entire system for returning the solids is situated inside the reactor. The big disadvantages of this system are the corrosion and erosion problems of the cyclone, as the cooling of the supporting structure cannot be arranged by simple means. Moreover, the system suffers from the sensitivity of the conventional cyclone to the suction flows of the return pipe.

BRIEF SUMMARY OF THE INVENTION

It is possible to eliminate the defects of the above mentioned apparatus by means of a simple apparatus according to the invention in which the bottom of the cylindrical vortex chamber of the separator is substantially conical in shape and the gas discharge pipe is arranged to go through the bottom and to direct the gases from which solid material has been removed downward.

BRIEF DESCRIPTION OF THE DRAWINGS

In order that the invention may be readily carried into effect, it will now be described with reference to the accompanying drawings, in which.

DETAILED DESCRIPTION OF PREFERRED EMBODIMENTS

Figure 1:
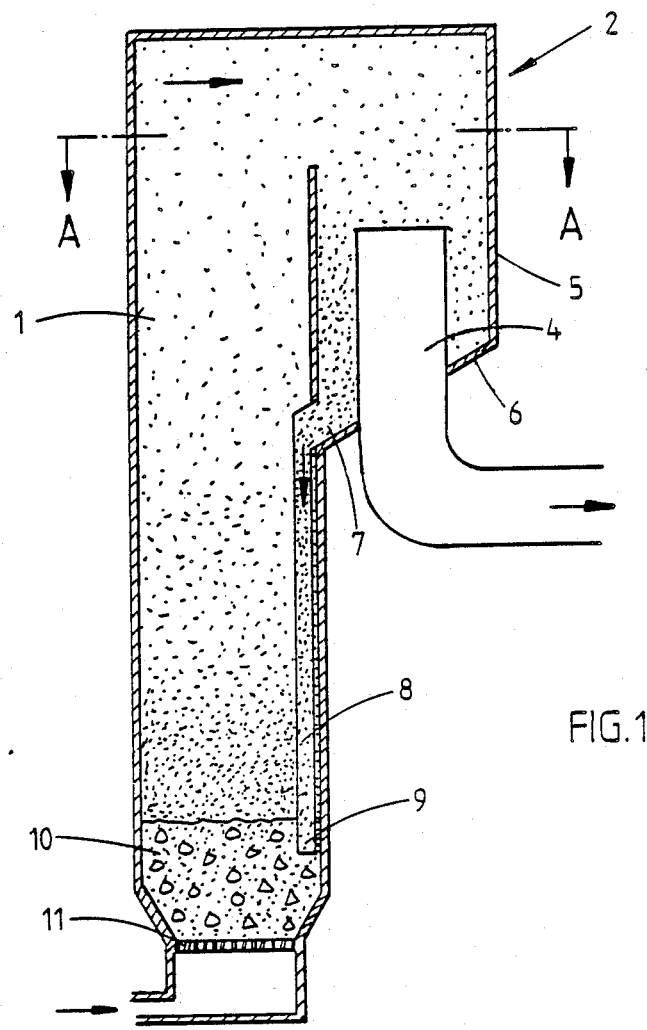
FIG. 1 is a vertical section of an embodiment of the apparatus of the invention
Figure 2:
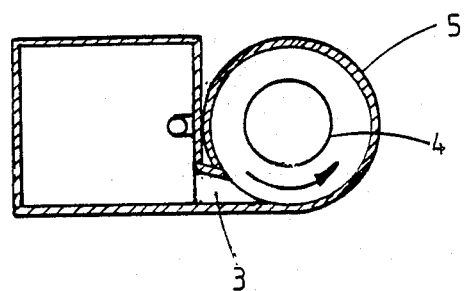
FIG. 2 is a sectional view, taken along the line A—A of FIG. 1.

In FIG. 1, a reactor chamber 1 operates according to the fluidized bed principle. In a cyclone separator 2, the gases flow tangentially from the upper part of the reactor through a nozzle (FIG. 2) and are discharged through a discharge pipe 4. The solid material separated onto the walls of a cylindrical vortex chamber 5 flows down to the bottom 6 of the cyclone separator 2, which bottom is inclined so that the lowest point of the bottom is adjacent to the reactor chamber 1. The solid material flows through an opening 7 and through a return pipe 8 to the lower part of the reactor chamber 1. The lower part 9 of the pipe, i.e. the discharge end, is disposed inside a dense, lower fluidized bed zone 10 formed at the bottom 11.

As for the flow regime, a flow-through cyclone according to the invention differs from the conventional cyclone in that the vacuum vortex formed in the center of the cyclone is always directed together with the main flow towards the gas discharge pipe 4. This alone decreases the suction effect of the cyclone when compared to a conventional solution. The axial and radial velocities prevailing in the lower part of a flow-through reactor are low, but the tangential velocity is high. Thus, the dust conveyed by an eventual suction flow cannot enter the discharge pipe 4, but is separated onto the walls and returned to the reactor 1. This system operates more stably than the known ones in case of instantaneous disturbances.

Figure 3:
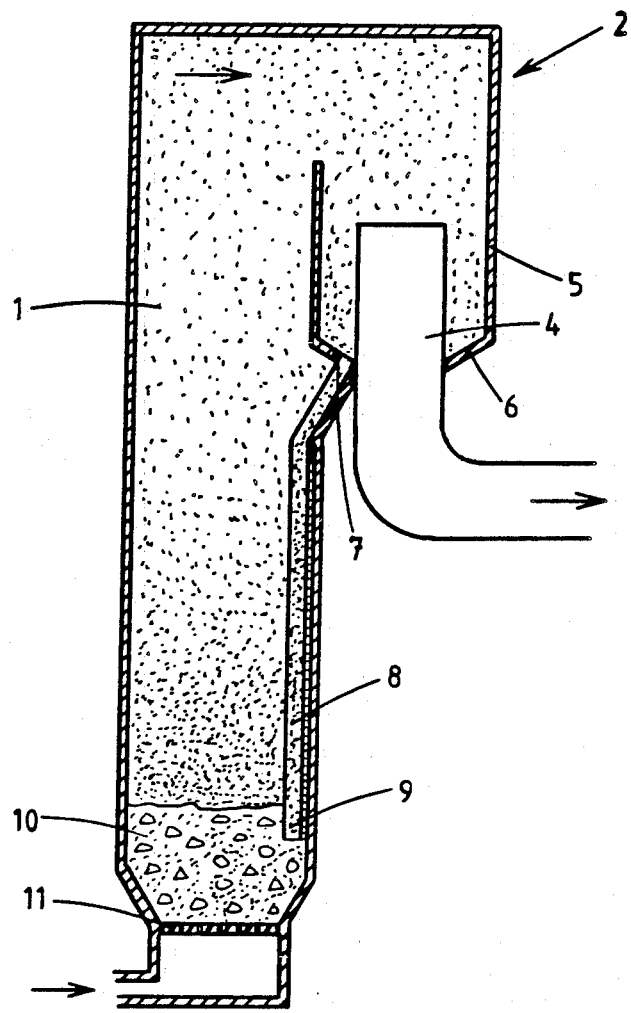
FIG. 3 is a vertical section of another embodiment of the apparatus of the invention wherein the vortex chamber has a conical bottom.

The embodiment of FIG. 3 of the invention is substantially identical to the embodiment of FIG. 1, except that the bottom 6 of the cyclone separator 2 of FIG. 3 has a conical shape rather than being substantially conical in shape as in FIG. 1. Furthermore the opening 7 to the return pipe 8 is differently configured to assure that the solid material will flow down through the pipe to the reactor chamber 1. The embodiment of FIG. 3 has a reactor chamber operating according to the fluidized bed principle and a cyclone separator 2 in which the gases flowing tangentially from the upper part of the reactor through a nozzle 3 are discharged through the discharge pipe 4. The solid material separated onto the walls of a cylindrical vortex chamber 5 flows down to the bottom 6 of the cyclone separator, which bottom is conically shaped. As hereinbefore mentioned, the solid material flows through a return pipe 8 to the lower part of the reactor chamber 1. The lower part or discharge end 9 of the return pipe 8, is disposed inside a dense, lower fluidized bed zone 10 formed at the bottom 11.

It should be noted that the conical bottom 6 of the cyclone separator 2 could be inverted such that the solid material flows along an incline extending outward and downward from discharge pipe 4 before passing through opening 7 to return pipe 8.

There is no need to transport the solids horizontally in a flow-through cyclone separator and the return pipe, is an open, direct pipe the lower end of which extends into the fluidized bed. Because of this, the fluidized bed which is formed in the reactor 1 simultaneously acts as a gas lock, so there is no need for a separate gas lock. Furthermore, a downward gas flow is produced in the return pipe 8, due to which said carrying capacity of the return pipe increases and the separation ability improves, especially regarding small particles which cannot settle against the gas flow.

The apparatus of the invention brings about obvious structural advantages. Thus, external return means can be replaced by a simple and inexpensive pipe positioned inside the reactor and the cooling of such pipe may be easily arranged, if required. Furthermore, the present solution is especially suitable for the structural requirements of steam boilers. Thus, the combustion chamber and the convection part located after the separator can be manufactured at an engineering workshop as one piece. For cooling the return pipe in a boiler application, it is sufficient to position the pipe adjacent a wall which is cooled.

EXAMPLE

A gasifier as shown in FIG. 1, having the following operational values:

| | |
|---|---|
| Dry peat, wood or coal | 100 g/s dry matter cont. ≧ 80% |
| Air | 7 mol/s |
| Product gas | 16 mol/s |
| Dust content of the gas | 10–30 kg/m$^3$N |
| Reactor temperature | 900–1000 °C. |
| Air temp. before the reactor | 300–400 °C. |
| Average particle size of the sand | 150 μm |
| Main dimensions | |

| -continued | |
|---|---|
| Reactor diameter | 0;6 m |
| Reactor height | 11;0 m |
| Cyclone diameter | 0;6 m |
| Diameter of the discharge pipe | 0;3 m |
| Diameter of the return pipe | 0;1 m |
| Cyclone height | 2;0 m |

The material of the return pipe is fire-proof steel and the structure uncooled. The trial runs have shown that the apparatus operates well. In practice, the separation ability of the cyclone has been 100% for the circulation material used.

What is claimed is:

1. In a fluidized bed reactor of the type wherein solid particles are conveyed by gases flowing through the reactor, the solid particles are separated and the separated solid particles are returned to a lower part of the fluidized bed reactor, wherein said reactor in the upper part thereof is connected to a cylindrical vortex chamber of a flow-through cyclone separator for separating the solid particles conveyed by the gases being discharged from the fluidized bed reactor, and which comprises a return pipe for the solid particles connected to the lower part of the flow-through cyclone separator and a gas discharge pipe disposed in the flow-through cyclone separator, the bottom of the cylindrical vortex chamber being inclined and said gas discharge pipe extending through the said bottom and into said separator and directing the gases from which the solid particles have been removed downward, said gas discharge pipe being arranged so that its walls form a substantially cylindrical partition of substantially constant diameter between the solid particles and the gases at the bottom of the chamber, whereby the vacuum vortex formed in the center of said flow-through cyclone is directed towards the gas discharging pipe and the pressure drop is reduced.

2. The reactor as to claim 1 wherein the lowest point of the bottom of said cylindrical vortex chamber is adjacent said reactor.

3. The fluidized bed reactor as claimed in claim 1, wherein the return pipe extends into the lower part of said fluidized bed.

4. The fluidized bed reactor as claimed in claim 1, wherein the bottom of said cylindrical vortex chamber of said separator is substantially conical in configuration.

* * * * *